United States Patent [19]

Liuo

[11] Patent Number: 5,011,323
[45] Date of Patent: Apr. 30, 1991

[54] ANGLE COUPLING STRUCTURE FOR KNOCKDOWN CABINETS

[76] Inventor: Chih C. Liuo, 2Fl., No. 4, Lane 767, Ming Sheng E. Rd., Taipei, Taiwan

[21] Appl. No.: 421,766

[22] Filed: Oct. 16, 1989

[51] Int. Cl.$^5$ ................................................ F16D 1/00
[52] U.S. Cl. .................................... 403/172; 403/403; 403/402
[58] Field of Search ............... 403/403, 402, 295, 172, 403/176

[56] References Cited

U.S. PATENT DOCUMENTS 2,947,391 8/1960 Wayne ............................ 403/404 X Primary Examiner—Andrew V. Kundrat

[57] ABSTRACT

An angle coupling structure for knockdown cabinets includes an angle coupling, a plurality of connectible sections, and a plurality of securing rods. Within each connectible section, an elongate channel is formed to receive a connecting rod projecting from the angle coupling. An elongated recess is formed generally below the elongated channel to receive one of the securing rods for permitting the rod to slidably move therein. An elongated slot is formed in a wall between the channel and the recess. A screw can be inserted through a hole preformed in the securing rod and past through the elongated slot to screw into a hole formed on the connecting rod, due to the adjustable position of the securing rod. The connectible sections, angle coupling, and securing rods are thus joined together tightly.

3 Claims, 3 Drawing Sheets

ANGLE COUPLING STRUCTURE FOR KNOCKDOWN CABINETS

BACKGROUND OF THE INVENTION

The present invention relates to an angle coupling structure for a knockdown cabinet.

It is known that a knockdown cabinet is assembled with a plurality of connectible sections while the assembly of such connectible sections as shown in FIGS. 3 and 4, relies on an angle coupling 100 having a plurality of connecting rods 101, each of which may extend into a connecting rod retainer 201 performed in a connectible section 200. A plurality of round holes 202 are present on an inner wall of the connecting rod retainer 201 in such a manner that such holes will correspond to threaded screw holes (not shown) preformed on the connecting rods 101 so that screws 300 may be screwed into the rods to join and fasten the connectible sections and the angle coupling (as shown in FIG. 4). However, it is frequently found that the holes 202 do not always match with the present threaded holes on connecting rods 101 when the connecting rods 101 are inserted into the connecting rod retainers 201. Whenever this situation happens, the user will need to adjust by himself the location of the angle coupling 100 to match the two sets of holes and fasten them with screws, or, he will have to send the product back; to the seller for re-drilling of new and matching hole(s). The former solution will result in a gap between each angle coupling 100 and connectible section 200 while the second solution will cause much inconvenience to the user.

SUMMARY OF THE INVENTION

It is therefore an object of the present invention to provide an angle coupling structure for knockdown cabinets assembled with plural connectible sections. Within each of such connectible sections, a connecting rod retainer and a securing aid retainer are preformed to be capable of receiving a connecting rod and a securing aid, respectively. An axially extending longitudinal slot is formed on the wall between the connecting rod retainer and the securing aid retainer so that screws may be put through round holes formed on the securing aid and through the longitudinal slot to precisely screw into the hole formed on the connecting rod projecting from the angle coupling by sliding the securing aid in the securing aid retainer to a proper position.

BRIEF DESCRIPTION OF THE DRAWINGS

A specific embodiment of the present invention will now be described with reference to the accompanying drawings of which.

DETAILED DESCRIPTION OF THE PREFERRED EMBODIMENT

Figure 1:
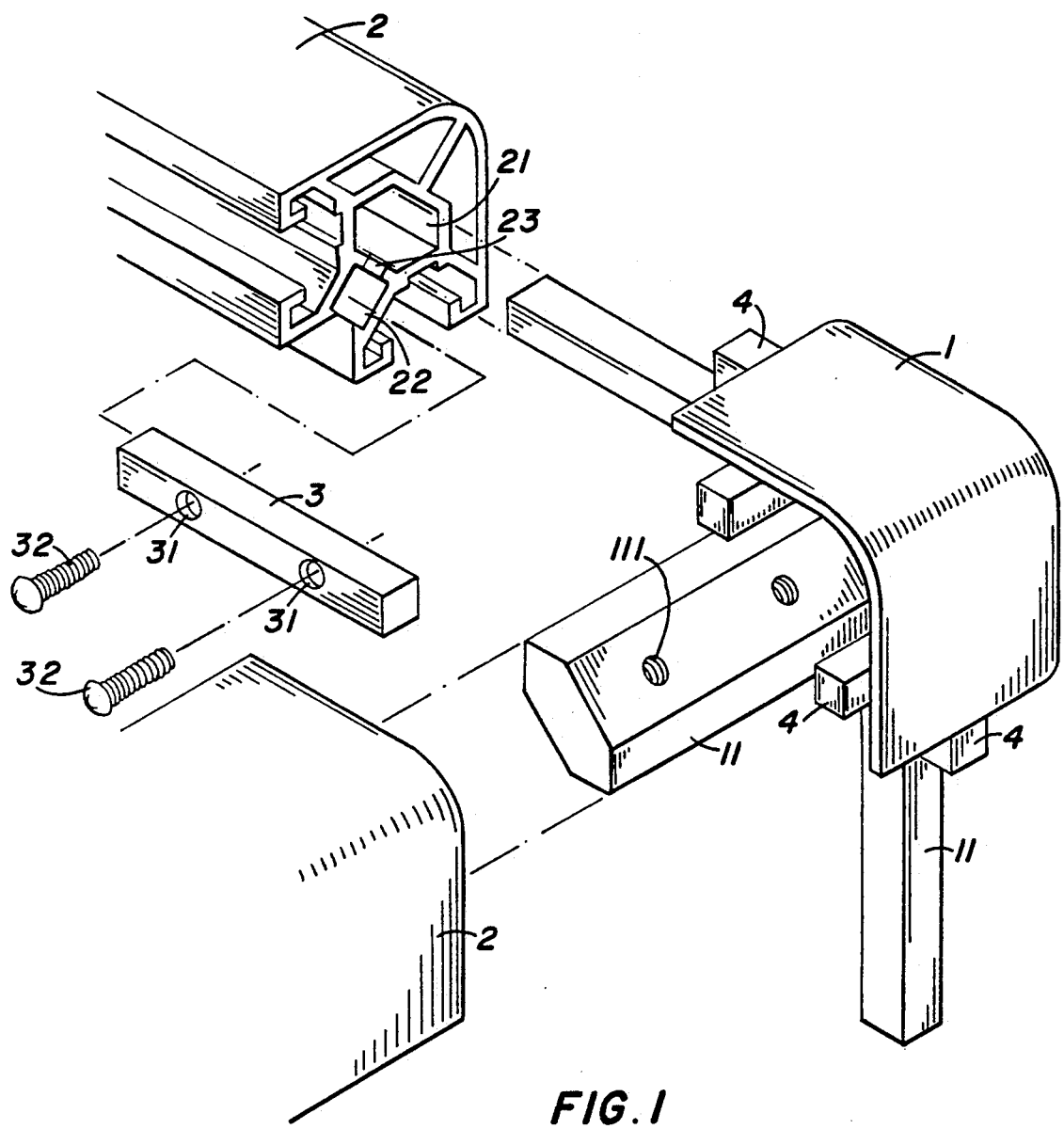
FIG. 1 is a three-dimensional analytical perspective of the present invention.
Figure 3:
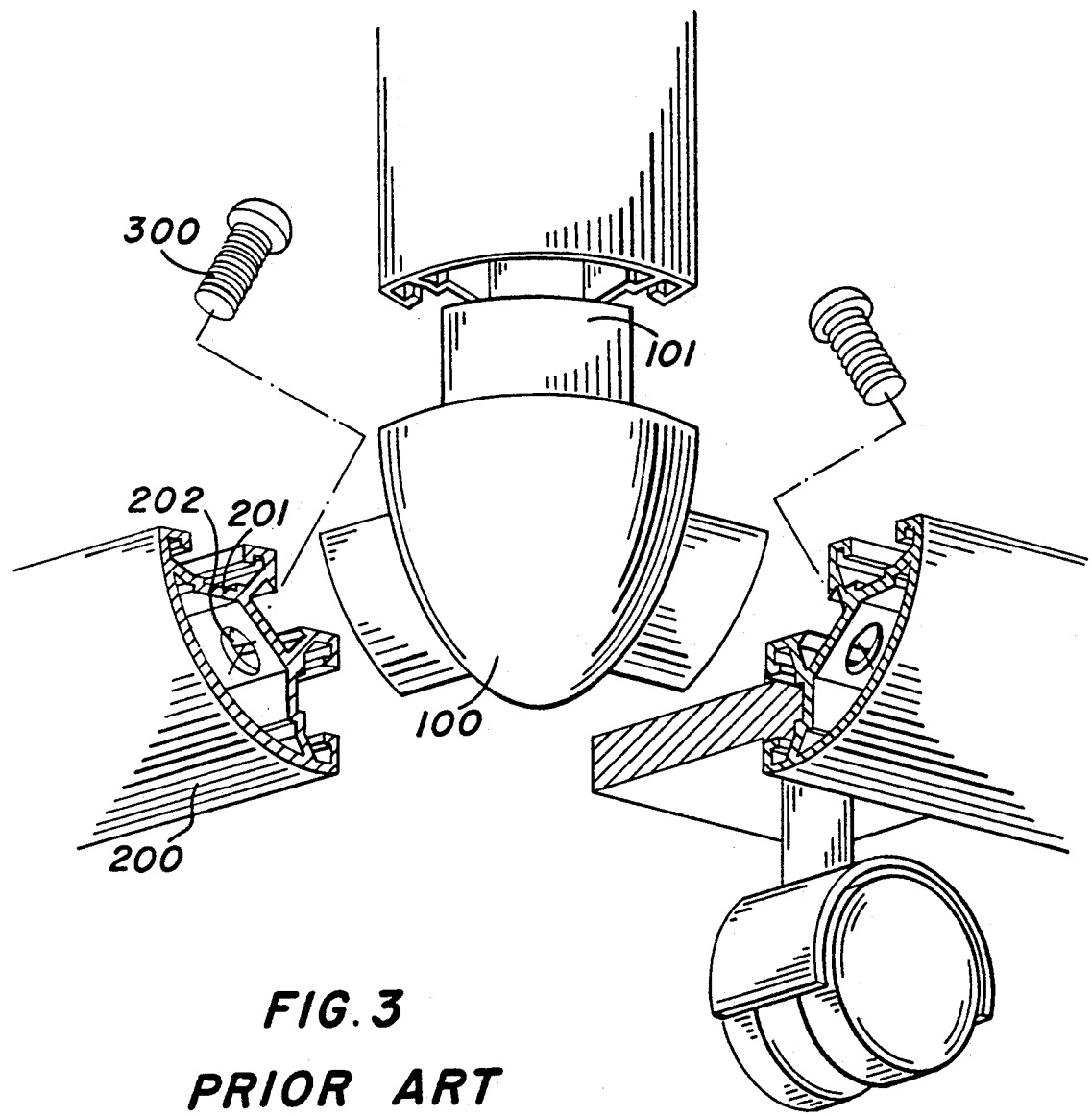
FIG. 3 is a three-dimensional analytical perspective of a conventional angle coupling structure for a knockdown cabinet.
Figure 2:
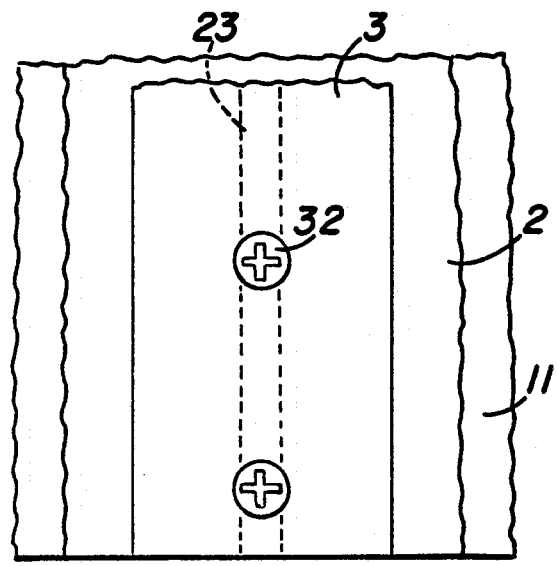
FIG. 2 is a plan view showing the joining of the connectible section with the connecting rod with a plurality of screws through the securing aid as well as the longitudinal slot.
Figure 4:
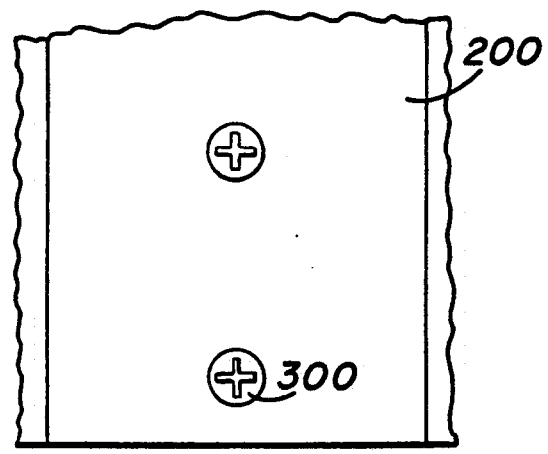
FIG. 4 is a plan view showing the joining of a connecting rod with a connectible section in a conventional coupling structure.

As shown in FIG. 1, an angle coupling structure for knockdown cabinets has an angle 1, a plurality of connectible sections 2, and a plurality of separate rectangular securing aids or rods 3. A plurality of connecting rods 11 having plural preformed screw holes 111 are fixed to and project from the angle coupling 1. Each of the connectible sections 2 is provided with a connecting rod retainer channel 21 for receiving a connecting rod 11, and a securing aid retainer channel 22 is formed generally below the connecting rod retainer channel 21 to receiving a securing aid 3. An axially extending longitudinal slot 23 is formed on the wall between the connecting rod retainer channel 21 and the securing aid retainer channel 22. A plurality of unthreaded round holes 31 provided on the securing aid 3 substantially correspond to the screw holes 111 formed on the connecting rod, respectively. With this arrangement, the securing aid 3 may be inserted into the securing aid retainer channel 22 to freely slidable move therein to be adjusted until the holes 31 on it may precisely match with those holes 111 on the connecting rod 11 thereby enables a screw 32 to pass through the hole 31, the longitudinal slot 23, and the screw hole 111 so as to screw the connectible section 2, securing aid 3, and the angle coupling 1 together tightly without leaving any gap between the angle coupling and the connectible section 2.

The specifications for the screw 32, round hole 31, longitudinal slot 23, and screw hole 111 are all the same to enable their joining. However, the size of the longitudinal slot 23 may be slightly larger while the screw 32 may be used together with washers. Since most of these are known by those who are familiar with this art, they will not be further described here. In addition, the cross-section of the connecting rod 11 corresponds to that of the connecting rod retainer channel 21 while the cross-section of the securing aid 3 is corresponding to that of the securing aid retainer 22. Such cross-sections may be properly changed while the same effect of joining may still be achieved.

FIG. 1 also shows a pair of fixing posts 4 connected to the angle coupling 1 on opposite sides of each rod 11 for sliding insertion into recesses in each connectable section 2 in the direction of insertion of the rod 11 into the channel 21.

While a specific embodiment of the present invention has been shown and described in detail to illustrate the application of the principle of the invention, it will be understood that the invention may embodied otherwise without departing from such principles.

I claim:

1. An angle coupling structure for knockdown cabinets comprising:

an angle coupling (1);

a plurality of elongated connecting rods (11) fixed to said angle coupling and extending from said angle coupling, each connecting rod extending at a different angle to each other connecting rod, each connecting rod having a plurality of threaded screw holes (111) therein spaced along the length of each respective connecting rod;

a plurality of separate and unconnected elongated securing rods (3) equal in number to said plurality of elongated connecting rods, each securing rod having a plurality of unthreaded round holes (31)

therein spaced along the length of each respective securing rod and spaced by an equal amount to the spacing of the screw holes in each respective connecting rod;

a plurality of elongated connectable sections (2), each connectable section having an elongated connecting rod retaining channel (21) therein having a cross sectional shape substantially corresponding to the cross sectional shape of one of said connecting rods for receiving one of said connecting rods therein, each connectable section having an elongated securing rod retaining channel (22) therein extending parallel to said connecting rod retaining channel, said securing rod retaining channel having a cross sectional shape substantially corresponding to the cross sectional shape of one of said securing rods for receiving one of said securing rods, each connectable section having a wall separating said connecting rod retaining channel from said securing rod retaining channel with a longitudinal slot (23) in said wall for providing continuous communication between the holes of a securing rod in said securing rod retaining channel and the holes of a connecting rod in said connecting rod retaining channel; and a plurality of screws for extending through the holes of said securing rods and the longitudinal slots and for being threaded into the holes in said connecting rods whereby said securing rods are freely slidable along said securing rod retaining channels for lining up the holes of said securing rods and said connecting rods to closely connect said angle coupling to said connectable sections.

2. An angle coupling structure according to claim 1, wherein said securing rods have a rectangular cross section, two holes being provided in each securing rod and in each connecting rod.

3. An angle coupling structure according to claim 2, including a pair of fixing posts (4) fixed to said angle coupling on either side of each of said connecting rods, each connectable section having a recess for slidable receiving each fixing post in a direction of insertion of said connecting rod into said connecting rod retaining channel.

* * * * *